United States Patent [19]
Lalezari et al.

[11] Patent Number: 5,404,583
[45] Date of Patent: Apr. 4, 1995

[54] PORTABLE COMMUNICATION SYSTEM WITH CONCEALING FEATURES

[75] Inventors: Farzin Lalezari, Louisville; Robert Marshall, Littleton, both of Colo.

[73] Assignee: Ball Corporation, Muncie, Ind.

[21] Appl. No.: 90,894

[22] Filed: Jul. 12, 1993

[51] Int. Cl.$^6$ .................... H04B 1/03; H04B 1/08
[52] U.S. Cl. ........................ 455/90; 455/89; 455/351; 343/702; 379/58; 379/437
[58] Field of Search .......... 455/3.2, 89, 90, 128, 455/129, 344, 347, 351, 269; 379/58, 437; 361/814; 343/702, 832, 834, 839, 872, 912, 895

[56] References Cited

U.S. PATENT DOCUMENTS

| | | |
|---|---|---|
| 1,804,676 | 5/1931 | Dalton . |
| 4,677,654 | 6/1987 | Lagin et al. ............ 455/89 X |
| 4,694,301 | 9/1987 | Wassum ................ 343/720 |
| 4,816,838 | 3/1989 | Mizuno et al. ......... 343/771 |
| 4,992,799 | 2/1991 | Garay ................... 343/702 |
| 5,019,833 | 5/1991 | Nonaka ................. 343/840 |
| 5,020,137 | 5/1991 | Barsumian ............. 455/90 |
| 5,138,328 | 8/1992 | Zibrik et al. .......... 343/702 |
| 5,170,173 | 12/1992 | Krenz et al. .......... 343/702 |
| 5,313,216 | 5/1994 | Wang et al. .......... 343/895 X |

OTHER PUBLICATIONS

Rockwell International/Collins Avionics & Communications Division–product information, "SEC*SAT Secure Satcom Terminal", 3 pages (no author, date or place of publication).

*Primary Examiner*—Edward F. Urban
*Assistant Examiner*—Chi H. Pham
*Attorney, Agent, or Firm*—Gilbert E. Alberding

[57] ABSTRACT

The present invention provides a portable communication system with functional components whose functions are not readily apparent to an observer. One embodiment of the system includes a carrying case in which the antenna portion of the communication system is concealed between the shell of the case and an inner liner; a reflector to protect the radio portion of the system from electromagnetic radiation and direct electromagnetic radiation to or from the antenna that is covered so that it simulates the appearance of the file folder portion of a briefcase; and a radio that is covered with a shell upon which are mounted the keyboard and CRT of an actual personal computer or a simulation thereof, so that when the case is open, it appears to contain a laptop computer.

25 Claims, 11 Drawing Sheets

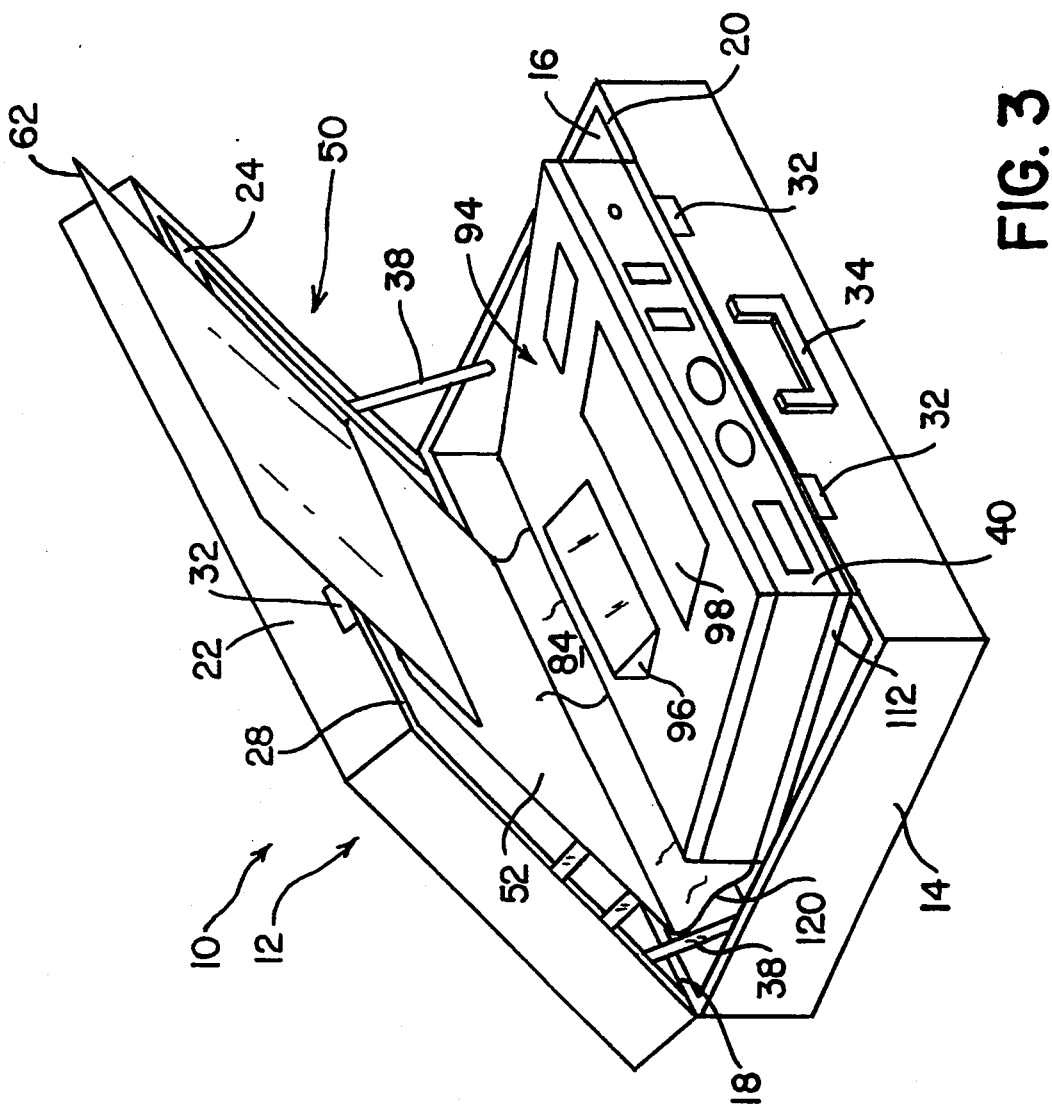

PORTABLE COMMUNICATION SYSTEM WITH CONCEALING FEATURES

BACKGROUND OF THE INVENTION

1. Field of the Invention

The present invention relates to communication systems and, in particular, to a portable communication system that an individual can carry from place to place.

2. Description of the Related Art

A basic communication system includes an antenna, a transmitter or receiver, or a combination of a transmitter and a receiver, which is typically referred to as a transceiver. In many instances, a portable communication system is desirable so that an individual can either transmit or receive from any number of locations. Many such portable communication systems have been devised. However, in many situations, the ability to prevent an observer from readily identifying a portable communication system as a communication system is needed. In these situations, present portable communication systems leave much to be desired. Specifically, in many portable communication systems, the antenna and/or the transmitting and receiving device are readily apparent to the casual observer. For instance, the antenna in many portable communication systems is either a prominent external component of the system or its presence can be readily discerned from the packaging of the system. In other portable communication systems, the transmitting and/or receiving device, if not a perceptible external aspect of the system, is readily identifiable upon deployment of the system.

Based on the foregoing, there is a need for a portable communication system whose identity as a communication system is not readily discernible to an observer.

SUMMARY OF THE INVENTION

The present invention provides a portable communication system with functional components that are not readily discernible to an observer. As a consequence, the portable communication system of the present invention lends itself to situations in which the ability to discreetly operate a communication system is needed and, in particular, to situations in which communications are conducted in the VHF and UHF bands.

One embodiment of the invention includes a hinged carrying case with a first side shell that contains a radio, which can be either a transmitter, a receiver, or a transceiver, and a second side shell that contains an antenna which is connected to the radio. In one embodiment, the antenna is a rectangular spiral antenna. The system further includes a reflector that is located between the antenna and the radio when the carrying case is open and serves to shield the radio and the operator from electromagnetic radiation as well as cooperate with the antenna to direct electromagnetic radiation to or from another communication device. Also included in the system is an interior liner that covers the antenna and thereby reduces interior visual indications of the presence of the antenna when the carrying case is open. Further, the reflector also covers at least part of the antenna when the carrying case is in an open condition and, as a consequence, supplements the coverage of the antenna by the interior liner as well as makes inspection of the liner and underlying antenna difficult. In addition, the second side shell covers the antenna in a manner that substantially eliminates any exterior visual indication of the presence of the antenna while also allowing electromagnetic radiation to pass to or from the antenna.

In another embodiment of the system, a cover is provided for the reflector that camouflages the presence of the reflector when the case is in an open condition. Consequently, the reflector can appear to be simply the retaining structure that is commonly used in suitcases and the like to keep the items on one side of the suitcase separate from the items on the other side of the suitcase or, in a briefcase, the file folder portion. Further embodiments include a device for deploying a reflector from a stowed to an operative location and a two-piece reflector in which the two pieces can be moved with respect to one another so that the area of the reflector can be adjusted.

In yet a further embodiment of the system, the radio is provided with a cover that camouflages the presence of the radio. One cover that is particularly useful includes a computer terminal, e.g., a keyboard and a CRT or a simulation thereof. Consequently, when the case is in an open condition, it appears to be merely a laptop or other portable computer. The system also includes a device for, when the case is in an open condition, deploying the radio from a location at which substantially only the cover for the radio is visible to a location at which the operator panel of the radio is accessible. This device facilitates the deployment of the radio as well as its concealment by allowing the user to relatively quickly place the radio in its concealed position if the need should arise.

BRIEF DESCRIPTION OF THE DRAWINGS

FIG. 3 illustrates the carrying case portion of the portable communication system in an open condition in which the radio is deployed and the reflector portion of the antenna is extended;

DETAILED DESCRIPTION OF AN EMBODIMENT OF THE INVENTION

The present invention provides a portable communication system 10, hereinafter system 10, with communication componentry that is camouflaged to prevent an observer from readily identifying the system 10 as a communication system. As a consequence, the system 10 can be used in situations in which the ability to discreetly use a communication system is of interest.

Figure 4A:
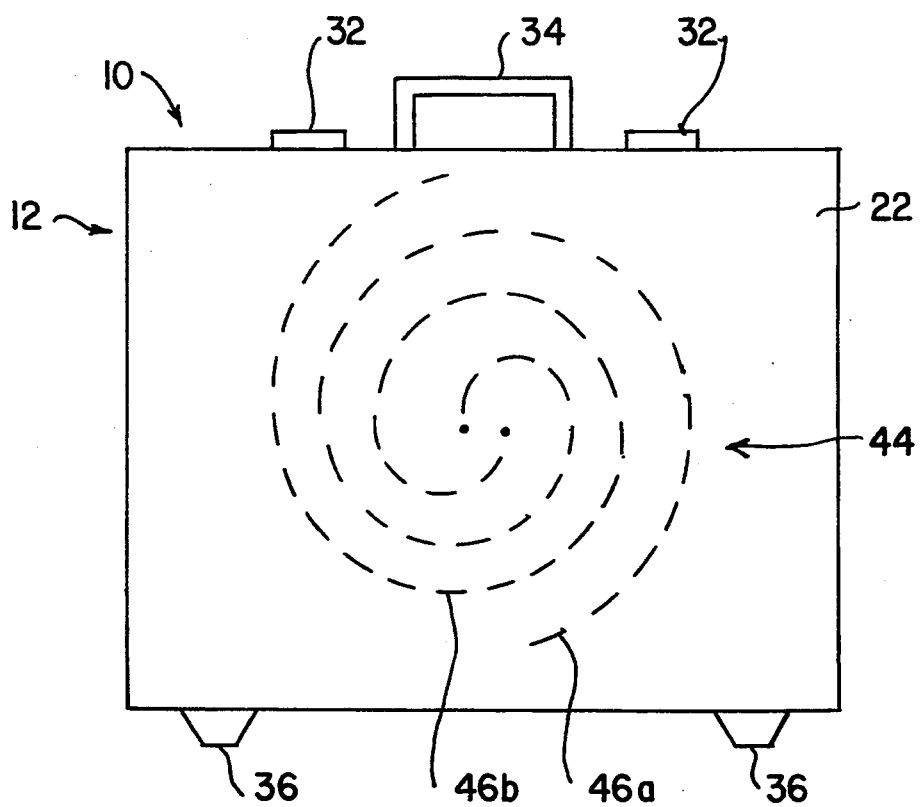
FIG. 4A illustrates a spiral antenna housed in one side of the carrying case.
Figure 4B:
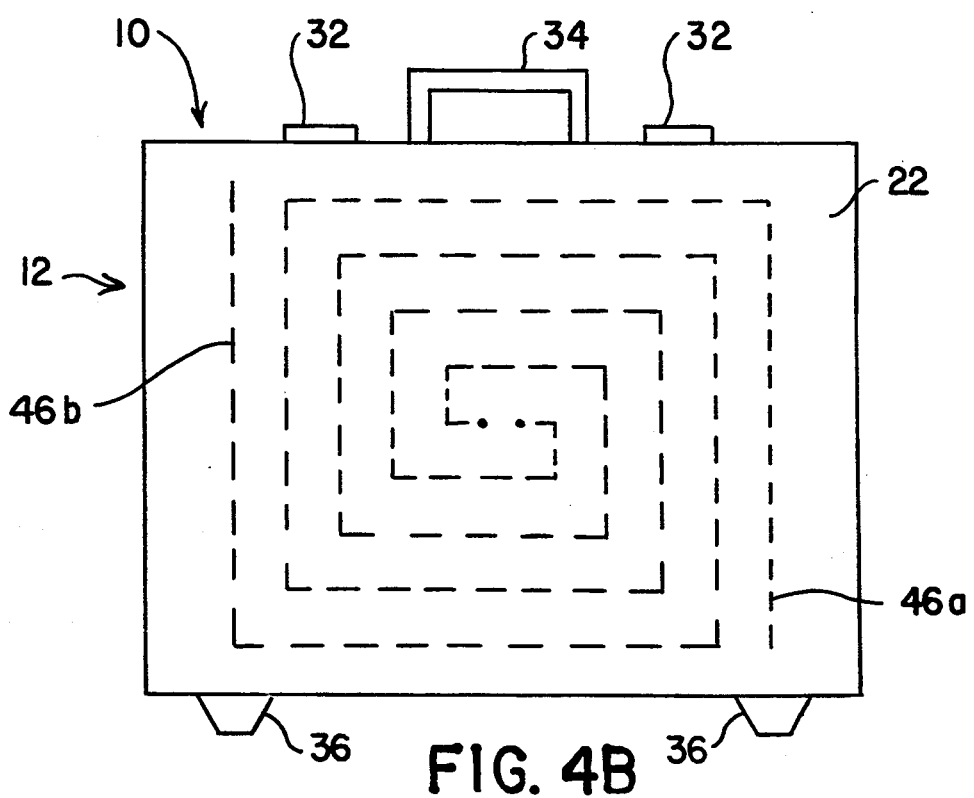
FIG. 4B illustrates a rectangular archimedean spiral antenna housed in one side of the carrying case.

With reference to the Figures, the system 10 includes a carrying case 12 with a first side shell 14. The first side shell 14 provides a first receptacle portion 16 for housing a radio, a first hinged edge 18, and a first free edge 20. The carrying case 12 also includes a second side shell 22 that includes a second receptacle portion 24 for housing an antenna and a reflector, a second hinged edge 26, and a second free edge 28. The first hinged edge 18 of the first side shell 14 and the second hinged edge 26 of the second side shell 22 are joined by hinges 30. Similarly, the first free edge 20 of the first side shell and the second free edge 28 of the second side shell 22 can be selectively connected or disconnected by latches 32. When the latches 32 are connected, the hinges 30 and the latches 32 cooperate to keep the carrying case 12 in the closed condition illustrated in FIGS. 1A-1B. Conversely, when the latches 32 are released, the hinges 30 keep the first shell 14 joined to the second shell 22 but allow the carrying case 12 to be placed in the open condition illustrated in FIGS. 2 and 3. The carrying case 12 also includes a grip 34 that facilitates portage of the carrying case 12 by an individual. In addition, the carrying case 12 includes runners 36 for use in standing the carrying case 12 as shown in FIG. 4A-4B.

Figure 2:
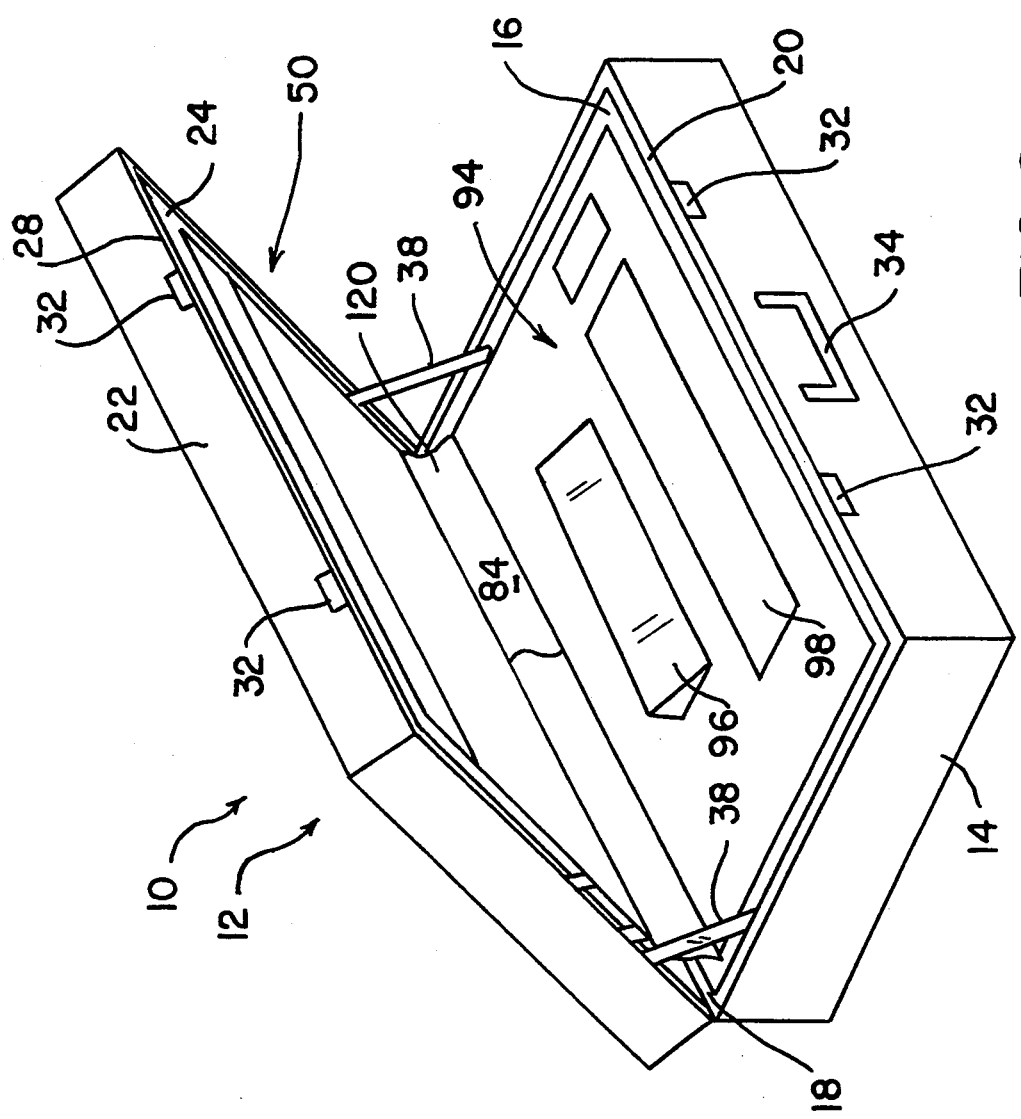
FIG. 2 illustrates the carrying case portion of the portable communication system in an open condition in which the radio is covered by a cap that includes either a computer terminal or a simulation thereof.

With reference to FIGS. 2 and 3, a pair of hinged braces 38 are also provided to hold the second side shell 22 at about a point about 50°-70° angle relative to the first side shell 14 when the case 12 is in an open condition. The 50°-70° angle adequately positions the antenna housed in the second receptacle portion 24 of the second side shell 22 for communication with many other communication devices and, in particular, with many of the satellite communication systems when the system 10 is located at some point between ±50° latitude. If it is necessary to position the antenna at a different angle or angles, the hinged braces 38 can be provided with an adjustment mechanism. With respect to satellite communications, this may be necessary if the system 10 is used outside the ±50° latitude or if the position of a satellite or satellite system relative to the system 10 requires it.

The system 10 further includes a radio 40, which can be either a transmitter, receiver, or transceiver. The radio 40 is housed in the first receptacle portion 16 of the first side shell 14. The first side shell 14 is made of a material that camouflages any external indications of the presence of the radio 40 in the carrying case 12. Preferably, the first side shell is made of a visually opaque material.

The system 10 further includes a spiral antenna that is located within the second receptacle portion 24 of the second side shell 22. A particular embodiment of the spiral antenna is the archimedean spiral antenna 44, illustrated in FIG. 4A, that includes a first arm 46a and a second 46b. The pitch angle of each arm varies with the radius and substantially equal spacing is maintained between the first and second arms 46a, 46b as they spiral outwardly. Alternatively, a rectangular archimedean spiral, as illustrated in FIG. 4B, can be used. The rectangular archimedean spiral more completely fills the second receptacle portion 24 and, as a consequence, provides higher gain and improved low frequency coverage. The second side shell is made of a material that camouflages any external indications of the presence of the antenna 44 within the second side shell 22 as well as permits electromagnetic radiation to flow to or from the antenna 44. Suitable materials include plastic, wood, cloth, and leather. Further, in one embodiment, there is a relationship between the second side shell and the antenna. Specifically, the circumference of the second side shell 22 is substantially equal to the wavelength of the signal to which the antenna is responsive.

The system 10 further includes a deployable reflector 50 that, when stowed, is located within the second receptacle portion 24 of the second side shell 22. The reflector 50 shields the radio 40 from electromagnetic radiation that may interfere with the operation of the radio 40. The reflector 50 also shields the operator from electromagnetic radiation. In addition, the reflector 50, when the antenna 44 is being used to transmit an electromagnetic signal, aids in directing the signal towards, for example, a satellite. The reflector 50 includes a first portion 52 that has a first lower edge 54, a first upper edge 56, a first right edge 58, and a first left edge 60. The reflector 50 also includes a second portion 62 that is connected to the first portion 52 with a first deployment mechanism that permits the effective area of the reflector 50 to be varied. The second portion 62 includes a second lower edge 64, a second upper edge 66, a second right edge 68, and a second left edge 70.

Figure 5:
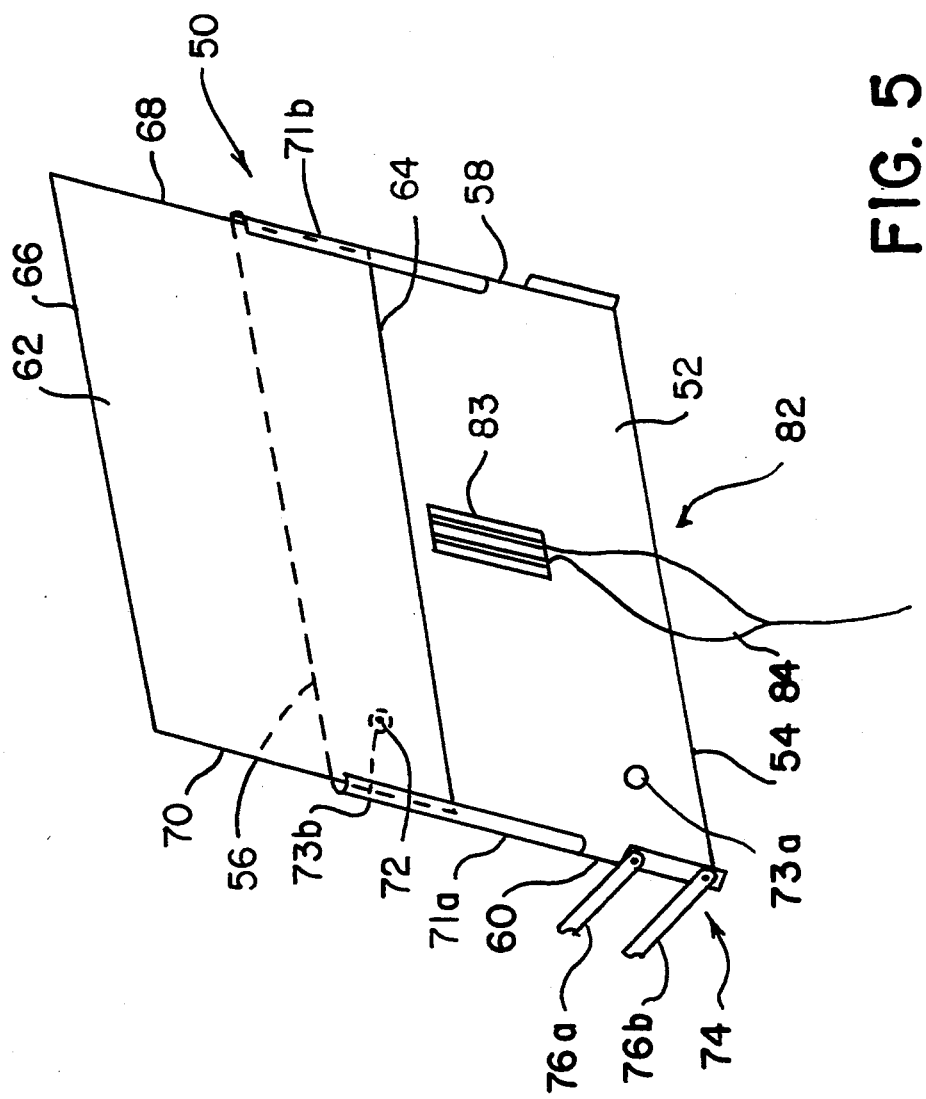
FIG. 5 illustrates the reflector in an extended state and the electrical connector between the antenna/reflector and the radio.
Figure 7:
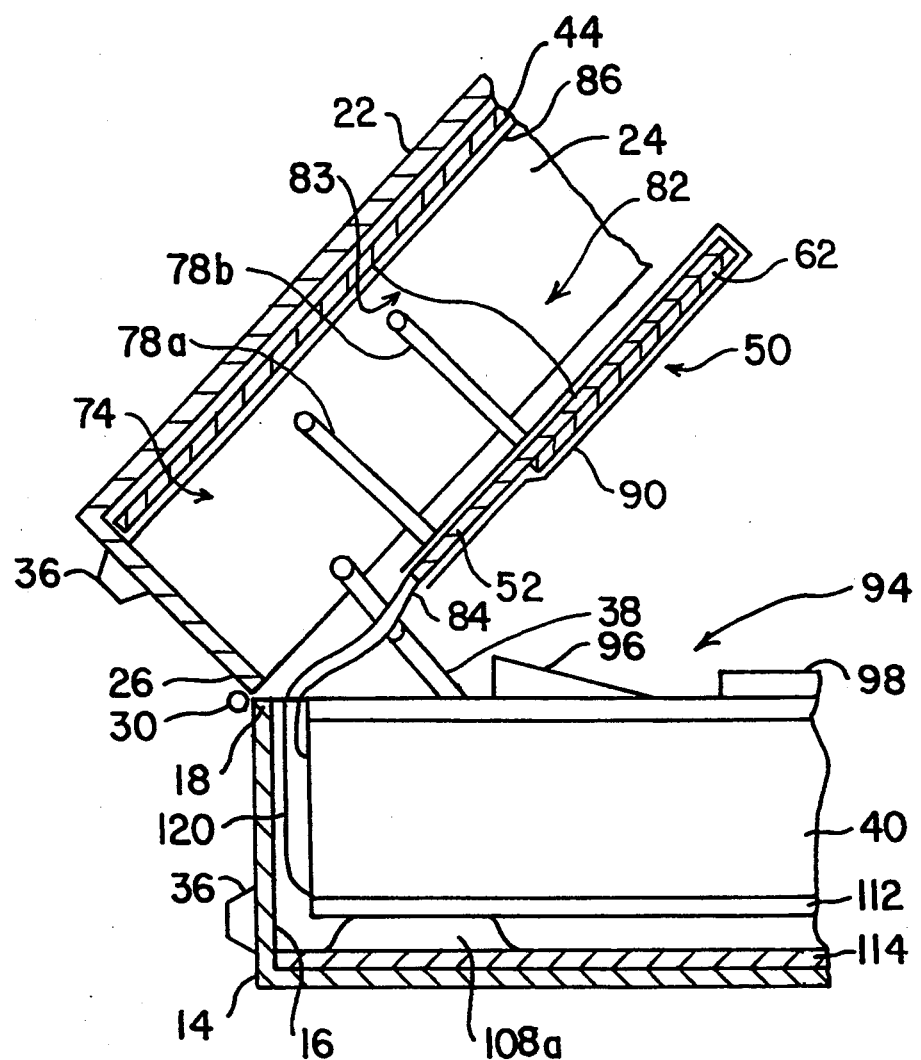
FIG. 7 is a lateral cross-section of the carrying case portion of the portable communication system that illustrates the two-piece reflector in a deployed condition in which one of the reflector surfaces has been extended away from the other reflector surface to increase the overall reflector surface area.

The first deployment mechanism, with reference to FIG. 5, includes a pair of rails 71a, 71b that are operatively attached to the first portion 52 and engage the second right edge 68 and second left edge 70 of the second portion 62 so that the second portion 62 can slide towards and away from the first portion 52 in a parallel fashion. The deployment mechanism also includes a spring/ball detent mechanism comprised of a spring/ball mechanism 72 located on the second portion 62 and oriented so that the ball can engage one of a pair of holes 73a, 73b in the first portion 52. (Other detent mechanisms are also feasible.) When the ball engages the hole 73a, the reflector 50 has an effective area of essentially only the first portion 52, since the first portion 52 completely overlaps the second portion 62. In contrast, when the ball engages the hole 73b, the reflector has an effective area extending from the first lower edge 54 to the second upper edge 66 and from the first right edge 58 and second right edge 68 to the first left edge 60 and the second left edge 70, as shown in FIGS. 3, 5, and 7. Actuation of the button portion of the mechanism allows the ball to be disengaged from a hole and the second portion 62 to be moved relative to the first portion.

As an alternative to the use of rails 71a, 71b and spring/ball detent mechanism, a hinge connecting the first and second portions of the reflector 50 and brace can be used to alter the effective area of the reflector.

Figure 6:
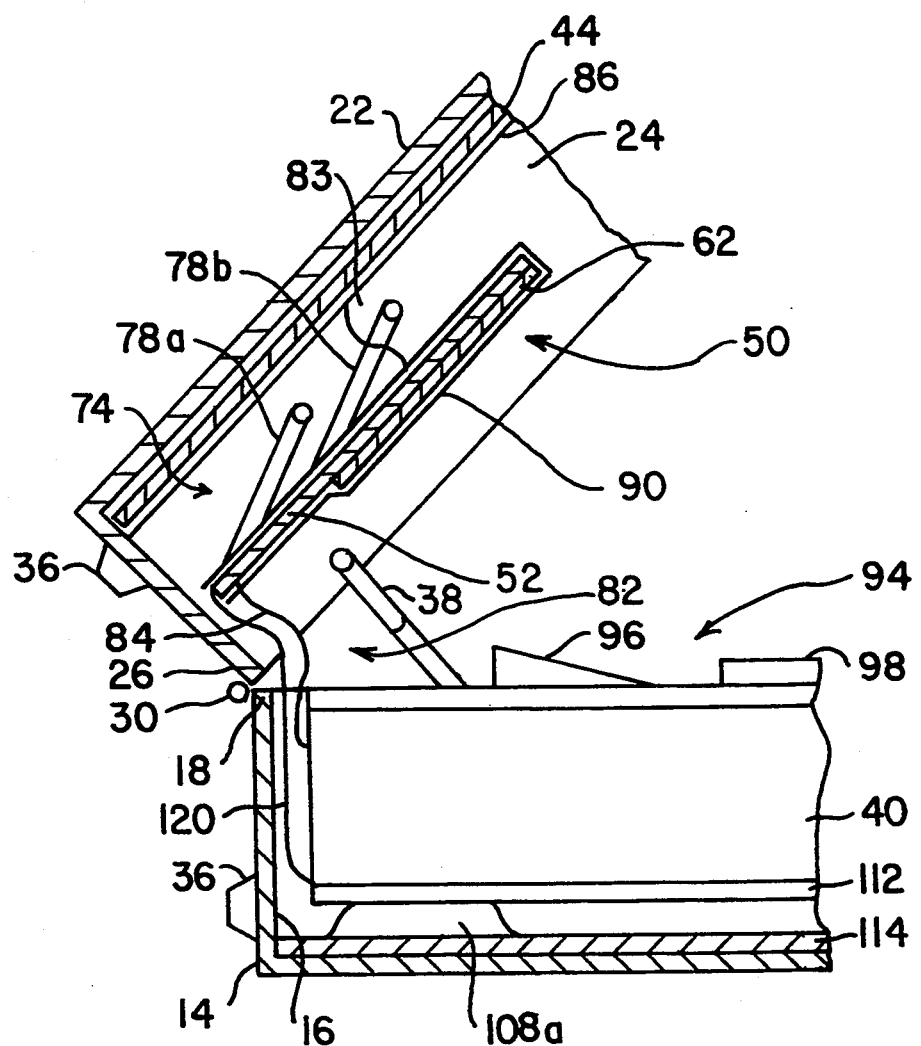
FIG. 6 is a lateral cross-section of the carrying case portion of the portable communications system that shows the two-piece reflector in a stowed condition that inhibits inspection of the liner and underlying antenna.

With reference to FIGS. 6 and 7, a second deployment mechanism 74 attaches the reflector 50 to the second side shell 22 as well as permits the reflector 50 to be moved from a stowed location within the second receptacle portion 24 to a deployed location when the case is in an open condition that permits the area of the reflector 50 to be varied, as previously discussed. The second deployment mechanism 74 includes a first pair of parallel hinges 76a, 76b that are each pivotally connected to both the interior of the second side shell 22 and the first right edge 58 of the first portion 52 of the reflector 50, and a second pair of parallel hinges 78a, 78b that are each pivotally connected to both the interior of the second side shell 22 and the first left edge 60 of the first portion 52 of the reflector 50. A detent mechanism is used to lock the parallel hinges in the deployed orientation illustrated in FIG. 7 and thereby deploy the reflector as shown in 7. Release of the detent mechanism allows the hinges to pivot to the orientation shown in FIG. 6 and the reflector 50 to be placed in a stowed condition.

With reference to FIGS. 5-8, a cable 82 is also included in the system 10 to connect the radio 40 to the antenna 44. The cable 82 includes a two-lead flex circuit 83 that extends from the antenna 44 to the reflector 50. Specifically, one end of one lead of the flex circuit 83 is operatively connected to a terminal end of first arm 46a of spiral antenna 44 and one end of the other lead is operatively connected to a terminal end of second arm 46b of antenna 44. The opposite ends of the flex circuit 83 from those connected to the antenna 50, extend through the reflector 50 and are connected to one end of a two-lead coaxial cable 84. The other end of the two-lead coaxial cable engages a connector that completes the circuit to the radio 40. The flex circuit 83 and two lead coaxial cable 84 in addition to electrically connecting the radio to the antenna 44 form a slot line that acts as an impedance matching network between the approximately 150 Ω impedance of antenna 44 and the approximately 50 Ω impedance of the radio 40.

Figure 8:
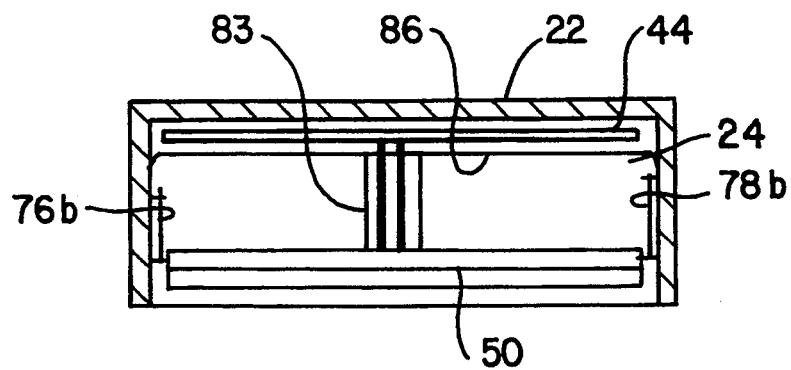
FIG. 8 is a longitudinal cross section of the portion of the carrying case that contains the antenna, the reflector, and flex circuit that connects the antenna to the reflector.
Figure 9:
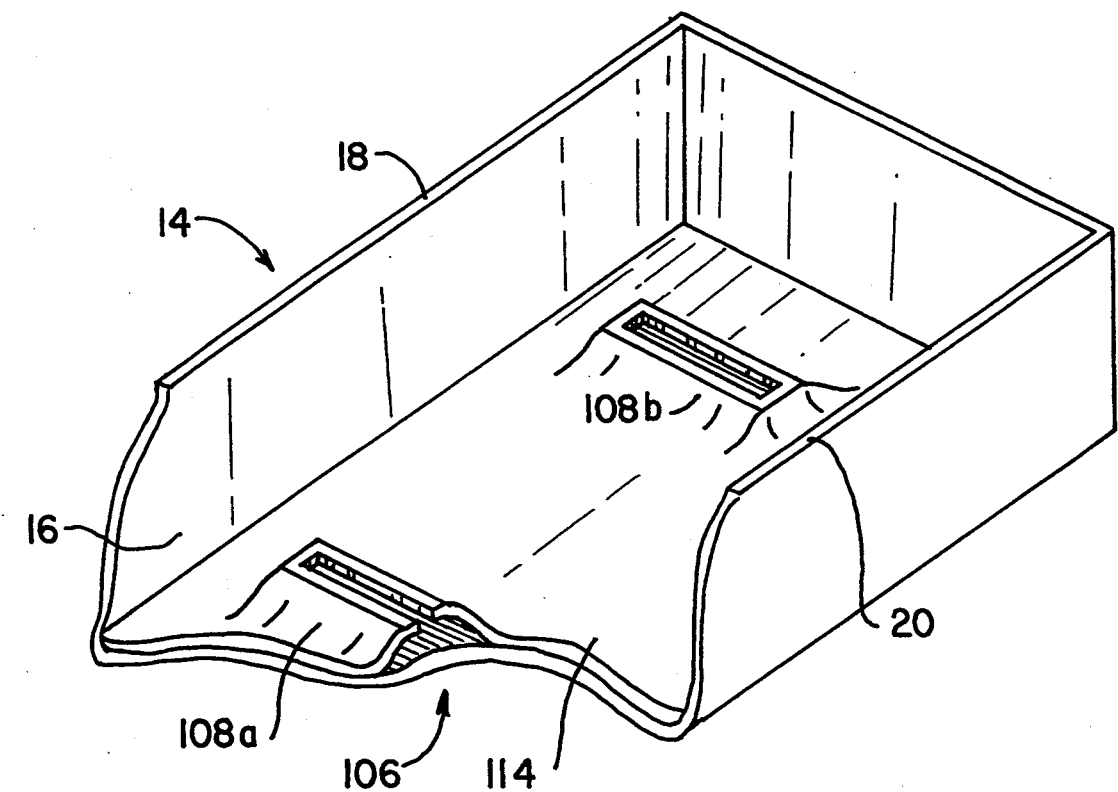
FIG. 9 illustrates the interior of the portion of the carrying case and, in particular, the mounts used in placing the radio in stowed and deployed positions.
Figure 10A:
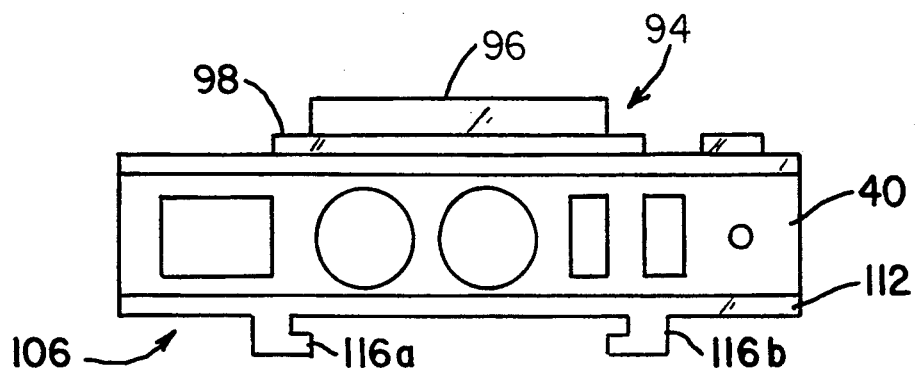
FIGS. 10A-10C are front, side and rear views of the radio and the baseplate that cooperates with the mounts in the carrying case to place the radio in stowed and deployed positions.
Figure 10B:
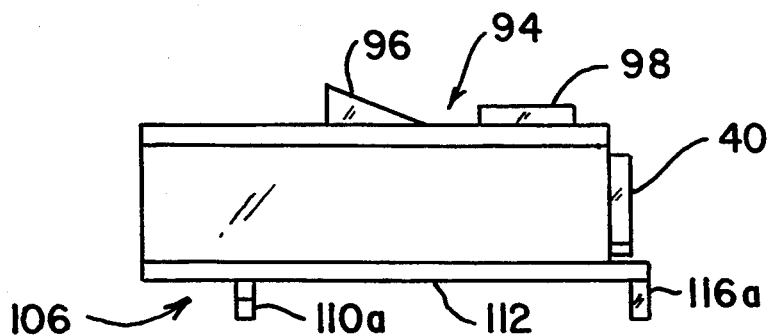
Figure 10C:
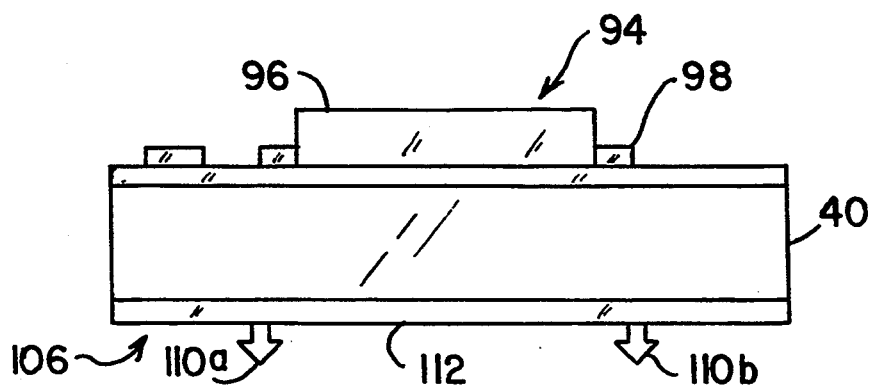

With specific reference to FIGS. 6-8, the system 10 further includes a liner 86 that is attached to the interior of the second side shell 22 and covers the antenna 44 to substantially eliminate any internal visual indication of the presence of the antenna 44. The liner 86 can be made of any material that permits electromagnetic radiation to be passed between the antenna 44 and the reflector 50. For instance, the liner 86 can be made of cotton, linen, plastic or leather.

The system 10 also includes a cover 90 for the reflector 50 that camouflages the reflector 50 and thereby reduces internal visual indications of the presence of the reflector 50. The cover 90 can also be made of any material that is capable of transmitting electromagnetic radiation between the antenna 44 and the reflector 50. For instance, the cover 90 can be made of cotton, linen, plastic or leather. Alternatively, the cover 90 can include paint. In FIG. 2, the reflector 50 and cover 90 appear, at least to the casual observer, to be merely the file folder portion of a briefcase. In a suitcase model, the reflector 50 and the cover 90 may appear to be simply the divider used to prevent the clothes or items in one side of a suitcase from getting mixed up with the clothes on the other side of the suitcase. For concealment, the two lead coaxial cable 84 can be positioned behind the cover 90.

With particular reference to FIGS. 2-3, 10, 11 and 12, the system 10 additionally includes a cap 94 for covering the radio and thereby reducing any interior visual indications of the presence of the radio 40. In the illustrated embodiment of the system 10, the cap 94 is either a computer terminal comprised of, for example, a CRT 96 and a keyboard 98 or a facsimile thereof. Consequently, when the case 12 is in an open condition and the radio is not deployed (as in FIG. 2), the system 10 appears to merely contain a portable or laptop computer device, which has become a relatively common item in recent years. Other cap configurations designed to meet a particular situation or application are feasible.

In addition, the system 10 includes a third deployment mechanism 106 that permits the radio 40 and the cap 94 to be lifted from a stowed position (FIG. 2) to a deployed position (FIG. 3) in which an operator panel of the radio 40 is accessible to an operator. The deployment mechanism 106 also permits the radio 40 to be relatively quickly concealed so that substantially only the cap 94 is visible. With reference to FIGS. 9-12, the third deployment mechanism 106 includes a pair of slotted rails 108a, 108b, that are located in the first receptacle 16 and engaged by a first pair of feet 110a, 110b that are part of a baseplate 112 that is attached to the underside of the radio 40. The slotted rails 108a, 108b, are formed as part of a vacuum-shaped plastic mounting plate 114 that resides in the first receptacle 16 of the first side shell 14. The plastic character of the slotted rails provides enough flexibility to allow insertion of the feet 110 during assembly but rigid enough when combined with the arrow-shape of the feet 110 to resist efforts at removal of the baseplate 112 and the radio 40 from the case 12. The baseplate 112 also includes a second pair of feet 116a, 116b that serve both to support the baseplate 112 and radio in a level condition when the radio is in a stowed condition and to engage the latches 32 of the carrying case 12 when the radio is deployed and thereby provide a stable platform for the radio 40.

Figure 11A:
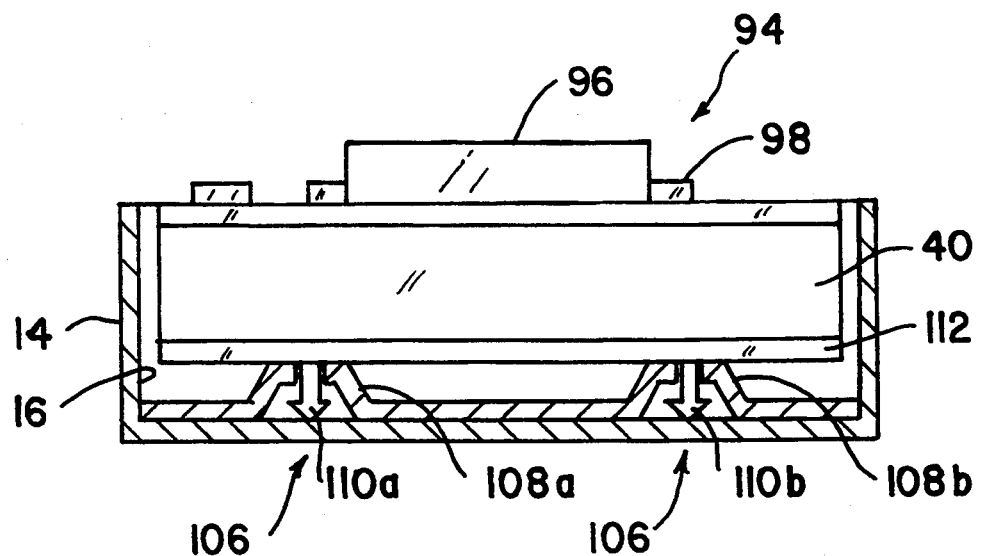
FIG. 11A is a rear cross-sectional view of the portion of the carrying case that contains the radio which illustrates the engagement between the baseplate and the mounts.
Figure 11B:
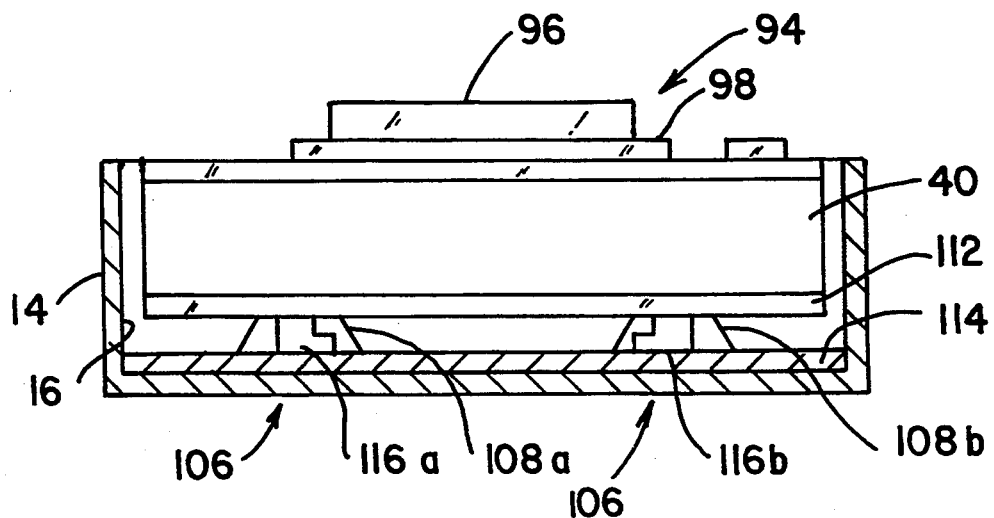
FIG. 11B is a front cross-sectional view of the portion of the carrying case that contains the radio.
Figure 12A:
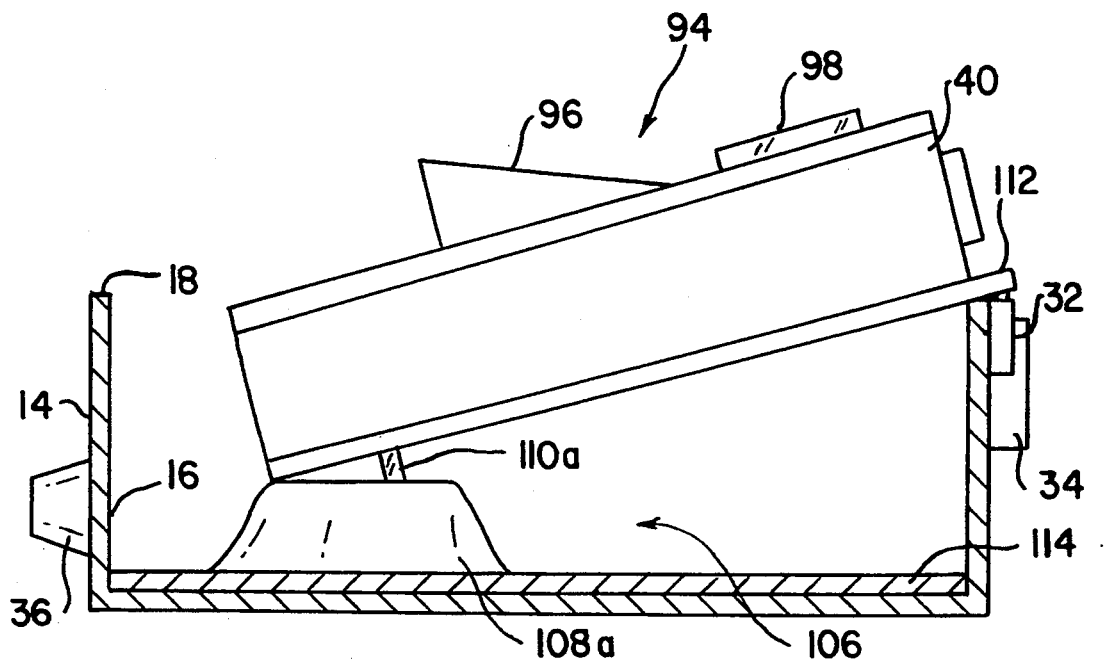
FIG. 12A is a lateral cross-sectional view of the portion of the carrying case that contains the radio which illustrates the radio in a deployed condition.
Figure 12B:
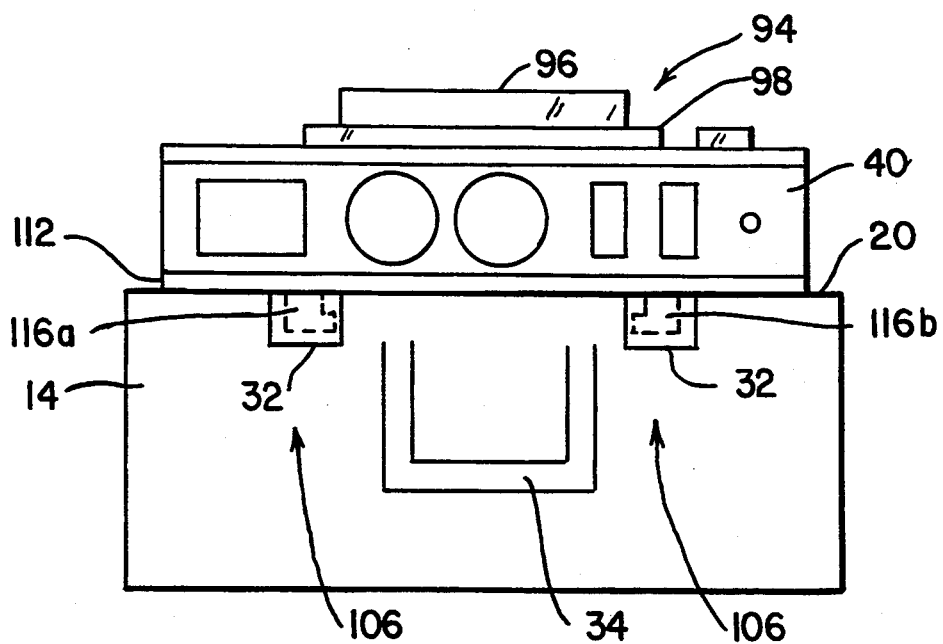
FIG. 12B is a front view of the position of the carrying case that contains the radio which illustrates the radio in a deployed condition and the engagement between the baseplate and the latches of the carrying case.

With reference to FIGS. 11-12, the operation of the third deployment mechanism 106 is illustrated. In FIGS. 11A-11B the first pair of feet 110a, 110b engage the pair of slotted rails 108a, 108b and the second pair of feet 116a, 116b contact the mounting plate 114 so that the cap 94 is substantially even with edge of the first side shell 14. As a consequence, the radio 40 is substantially hidden by the cap 94. Additionally, any computer terminal or facsimile thereof incorporated in the cap 94 will be in an operative position that does not invite closer inspection. To place the radio 40 in the deployed position illustrated in FIGS. 12A-12B, the radio 40 is lifted and then pulled towards the latches 32. When this happens, the first pair of feet 110a, 110b slide along the slotted rails 108a, 108b towards the latches 32. After the radio 40 has been lifted and pulled towards the latches 32, the baseplate 112 is positioned so that the second pair of feet 116a, 116b can engage the latches 32 and lock the baseplate 112 in place. To stow the radio 40, the latches 32 are released, the radio 40 and baseplate 112 are lifted, displaced towards the hinges 30, and finally set down into the first receptacle 16. This operation can be done relatively quickly should the need arise to camouflage the system 10.

To prevent resonance of the reflector 50, a conductive fabric sheet 120 that contacts the baseplate 112, which is grounded to the radio 40, is included in the system 10. If the first free edge 20 of the first side shell is made of a conductive material and susceptible to resonance, the first pair of parallel hinges 76a, 76b and/or the second pair of parallel hinges 78a, 78b can be used to ground the first free edge to the radio 40, reflector 50 and baseplate 112. Likewise, if the second free edge 28 is susceptible to resonance, the latches 32 can be used to establish a ground connection to the radio 40, reflector 50 and baseplate 112.

Figure 1A:
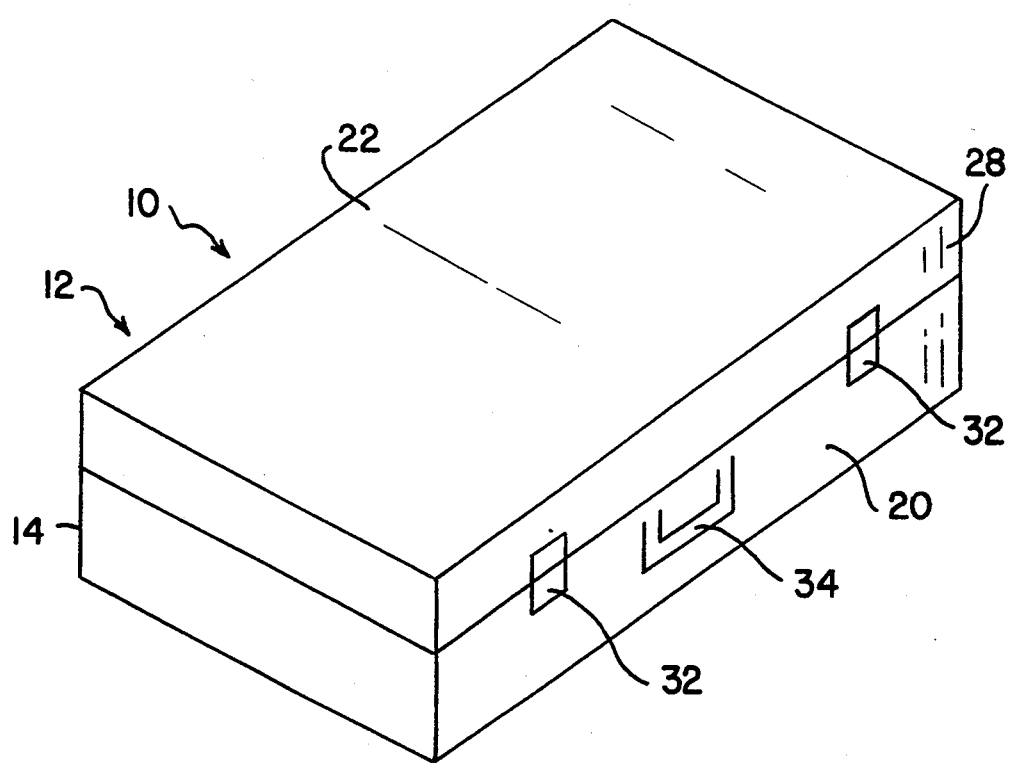
FIGS. 1A-1B are various perspective views of the exterior of the carrying case portion of the portable communication system of the present invention.
Figure 1B:
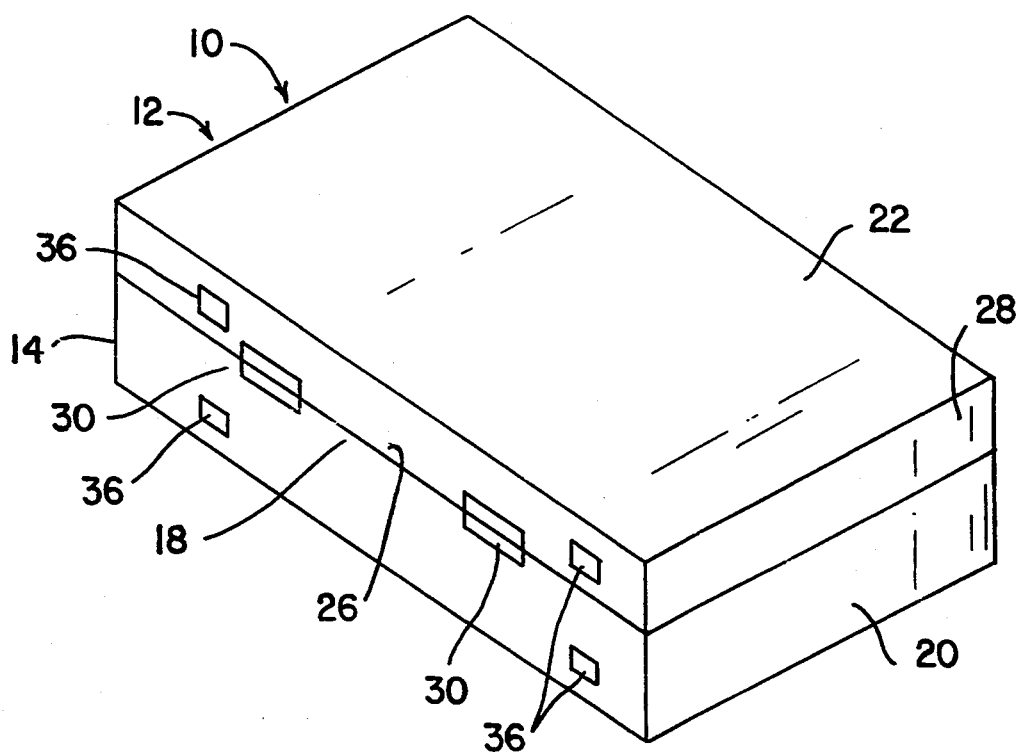

When the system 10 is not being operated as a communication system and the carrying case 12 is in a closed condition as shown in FIGS. 1A–1B, the system 10 appears to be merely a briefcase or suitcase with little, if any, exterior indications that it contains a communication system. Similarly, when the carrying case 12 is in the open condition, but the radio 40 is not deployed, the system 10 appears merely to be a laptop or portable computer system as shown in FIG. 2. When, however, the third deployment mechanism 106 has been used to place the radio 40 so that the operator panel is exposed, the antenna 44 positioned with the use of the hinged braces 38, and the reflector 50 deployed, as shown in FIG. 3, the system 10, to a casual observer, still appears to be a portable or laptop computer system. Further, the operator has the ability to quickly conceal the reflector 50 by activation of the spring/ball mechanism 72 and radio 40 using the latching mechanism 106, should the need arise.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described herein above is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. A portable communication system comprising:
    a carrying case that includes a first side shell with a first hinged edge, a first free edge and a first receptacle portion, a second side shell with a second hinged edge, a second free edge, and a second receptacle portion, wherein said second side shell is made of a material that is electromagnetically transmissive, a hinge for operatively joining said first hinged edge and said second hinged edge, a means for releasably latching said first free edge to said second free edge so that said carrying case can be placed in a closed condition that conceals said first receptacle portion and said second receptacle portion or in an open condition which exposes said first receptacle portion and said second receptacle portion, and a hand grip that is operatively connected to at least one of said first side shell and said second side shell;
    a radio that is located in said first receptacle portion;
    an antenna that is located in said second receptacle portion, wherein said second side shell covers said antenna to reduce exterior visual indications of the presence of said antenna;
    means for operatively connecting said radio and said antenna;
    a reflector for directing electromagnetic radiation relative to said antenna that is located between said antenna and said radio when said carrying case is in an open condition and serves to at least partly cover said antenna when said carrying case is in said open condition; and
    a liner that is located between said antenna and said reflector, wherein said liner substantially reduces interior visual indications of the presence of said antenna when said carrying case is in said open condition.

2. A portable communication system, as claimed in claim 1, further including:
    means for covering said reflector to camouflage said reflector when said carrying case is in said open condition.

3. A portable communication system, as claimed in claim 1, further including:
    means for covering said radio so that when said carrying case is in said open condition, the presence of said radio can be camouflaged.

4. A portable communication system, as claimed in claim 1, further including:
    means for covering said radio so that when said carrying case is in said open condition, the presence of said radio is camouflaged, said means for covering includes a computer terminal or means for visually simulating a computer terminal.

5. A portable communication system, as claimed in claim 1, further comprising:
    means for deploying said radio from a first radio location to a second radio location that is different than said first radio location when said carrying case is in an open condition.

6. A portable communication system, as claimed in claim 1, further including:
    means for covering said radio; and
    means for deploying said radio from a first radio location to a second radio location that is different than said first radio location when said carrying case is in an open condition, wherein when said radio is in said first radio location, said means for covering substantially camouflages the presence of said radio and when said radio is in said second radio location, an operator interface portion of said radio is exposed.

7. A portable communication system, as claimed in claim 1, wherein:
    said radio includes a computer terminal or means for simulating a computer terminal;
    said portable communication system further including means for deploying, when said carrying case is in said open condition, said radio from a first radio location at which substantially only said computer terminal or said simulated computer terminal of said radio is visible to a second radio location that is different than said first location and exposes an operator panel of said radio.

8. A portable communication system, as claimed in claim 1, wherein:
said second side shell is visually opaque.

9. A portable communication system, as claimed in claim 1, wherein:
said second side shell is substantially continuous in the area overlying said antenna.

10. A portable communication system, as claimed in claim 1, wherein:
said antenna includes a spiral antenna.

11. A portable communication system, as claimed in claim 1, further including:
means for deploying said reflector from a first reflector location to a second reflector location between said antenna and said radio when said carrying case is in said open condition.

12. A portable communication system comprising:
a carrying case that includes a first side shell with a first hinged edge, a first free edge and a first receptacle portion, a second side shell with a second hinged edge, a second free edge and a second receptacle portion, a hinge for operatively joining said first hinged edge and said second hinged edge, a means for releasably latching said first free edge to said second free edge so that said carrying case can be placed in a closed condition that conceals said first receptacle portion and said second receptacle portion or in an open condition which exposes said first receptacle portion and said second receptacle portion, and a hand grip that is operatively connected to at least one of said first side shell and said second side shell;
a radio that is located in said first receptacle portion;
an antenna that is located in said second receptacle portion;
means for operatively connecting said radio and said antenna;
a reflector for directing electromagnetic radiation relative to said antenna and at least partly covering said antenna when said carrying case is in said open condition; and
first means for deploying said reflector from a first reflector location to a second reflector location between said antenna and said radio when said carrying case is in said open condition.

13. A portable communication system, as claimed in claim 12, wherein:
said reflector includes a first portion and a second portion that is movable relative to said first portion.

14. A portable communication system, as claimed in claim 12, wherein:
said reflector includes a first portion, a second portion, and second means for deploying said second portion from a third reflector location at which said first and second portions provide a first surface area for directing electromagnetic radiation relative to said antenna to a fourth reflector location at which said first and second portions provide a second surface area for directing electromagnetic radiation relative to said antenna that is greater than said first surface area.

15. A portable communication system, as claimed in claim 12, wherein:
said antenna includes a spiral antenna.

16. A portable communication system, as claimed in claim 12, further comprising:
a liner that is located between said antenna and said reflector, said liner substantially reducing interior visual indications of the presence of said antenna when said carrying case is in said open condition;
means for covering said reflector to disguise the presence of said reflector when said carrying case is in said open condition;
second means for deploying said radio from a first radio location to a second radio location that is different than said first radio location when said carrying case is in said open condition; and
means for covering said radio so that when said carrying case is in said open condition and said radio is in said first radio location, the presence of said radio is camouflaged and when said radio is in said second radio location, an operator interface of said radio is exposed;
wherein said second side shell is made of a material that is electromagnetically transmissive and covers said antenna to reduce exterior visual indications of the presence of said antenna.

17. A portable communication system comprising:
a carrying case that includes a first side shell with a first hinged edge, a first free edge and a first receptacle portion, a second side shell with a second hinged edge, a second free edge, and a second receptacle portion, a hinge for operatively joining said first hinged edge and said second hinged edge, a means for releasably latching said first free edge to said second free edge so that said carrying case can be placed in a closed condition that conceals said first receptacle portion and said second receptacle portion or in an open condition which exposes said first receptacle portion and said second receptacle portion, and a hand grip that is operatively connected to at least one of said first side shell and said second side shell;
a radio that is located in said first receptacle portion;
a spiral antenna that is located in said second receptacle portion and includes a first arm and a second arm which is separate from said first arm; and
a reflector for directing electromagnetic radiation relative to said spiral antenna that is located between said radio and said spiral antenna and serves to, at least partly, cover said antenna when said carrying case is in said open condition;
means for operatively connecting said radio to said antenna.

18. A portable communication system, as claimed in claim 17, wherein:
said spiral antenna includes an archimedean spiral antenna.

19. A portable communication system, as claimed in claim 17, wherein:
said second side shell has a circumference approximately equal to the wavelength of the signal to which said antenna is responsive.

20. A portable communication system, as claimed in claim 17, wherein:
said hinge means includes means for adjusting the angle of said second side shell to said first said shell when said case is in said open condition.

21. A portable communication system, as claimed in claim 17, further including:
a liner that is located between said spiral antenna and said reflector, said liner substantially reducing interior visual indications of the presence of said spiral antenna;
first means for deploying said reflector from a first reflector location to a second reflector location between said antenna and said radio when said carrying case is in said open condition;

means for covering said reflector to disguise the presence of said reflector;

second means for deploying said radio from a first radio location to a second radio location that is different than said first radio location when said case is in said open condition; and means for covering said radio so that when said carrying case is in said open condition and said radio is in said first radio location, the presence of said radio is camouflaged and when said radio is in said second radio location, an operator interface of said radio is exposed;

wherein said second side shell is made of a material that is electromagnetically transmissive and reduces external visual indications of the presence of said antenna in said second receptacle portion of said second side shell.

22. A portable communication system comprising:

a carrying case that includes a first side shell with a first hinged edge, a first free edge and a first receptacle portion, a second side shell with a second hinged edge, a second free edge, and a second receptacle portion, wherein said second side shell is made of a material that is electromagnetically transmissive, a hinge for operatively joining said first hinged edge and said second hinged edge, a means for releasable latching said first free edge to said second free edge so that said carrying case can be placed in a closed condition that conceals said first receptacle portion and said second receptacle portion or in an open condition which exposes said first receptacle portion and said second receptacle portion, and a hand grip that is operatively connected to at least one of said first side shell and said second side shell;

a radio that is located in said first receptacle portion;

an antenna that is located in said second receptacle portion, wherein said second side shell covers said antenna to reduce exterior visual indications of the presence of said antenna;

means for operatively connecting said radio and said antenna;

means for deploying said radio from a first radio location to a second radio location that is different than said first radio location when said case is in said open condition; and means for covering said radio so that when said carrying case is in said open condition and said radio is in said first radio location, the presence of said radio is camouflaged, and when said carrying case is in said open condition and said radio is in said second radio location, an operator interface of said radio is exposed.

23. A portable communication system, as claimed in claim 22, wherein:

said means for covering includes a computer terminal or means for visually simulating a computer terminal.

24. A portable communication system, as claimed in claim 22, further including:

a liner that is located adjacent to said antenna to substantially reduce interior visual indications of the presence of said antenna when said carrying case is in said open condition;

a reflector for directing electromagnetic radiation relative to said antenna that is located between said liner and said radio when said carrying case is in said open condition and at least partly covers said antenna when said carrying case is in said open condition;

means for covering said reflector to camouflage said reflector when said carrying case is in said open condition; and means for deploying said reflector from a first reflector location to a second reflector location between said antenna and said radio when said carrying case is in said open condition.

25. A portable communication system comprising:

a carrying case that includes a first side shell with a first hinged edge, a first free edge and a first receptacle portion, a second side shell that includes a second hinged edge, a second free edge, a second receptacle portion and is made of a material that is electromagnetically transmissive, a hinge for joining said first hinged edge and said second hinged edge, means for releasably latching said first free edge and said second free edge so that said case can be placed in a closed condition in which said first receptacle portion and said second receptacle portion are concealed and an open condition in which said first receptacle portion and said second receptacle portion are exposed, and a hand grip that is operatively connected to at least one of said first side shell and said second side shell;

a radio that is located in said first receptacle portion, said radio includes a computer terminal or means for simulating a computer terminal;

means for deploying said radio from a first radio location at which substantially only said computer terminal or said means for simulating a computer terminal are visible when said carrying case is in said open condition to a second radio location that exposes an operator panel of said radio when said carrying case is in said open condition;

a substantially rectangular spiral antenna located in said second receptacle portion, wherein said second side shell substantially reduces exterior visual indications of the presence of said antenna in said second receptacle portion of said second side shell;

a liner that is located in said second receptacle portion and covering said antenna to reduce interior visual indications of the presence of said antenna;

a reflector that is located between said liner and said radio to direct electromagnetic radiation relative to said antenna and to at least partly cover said antenna when said carrying case is in said open condition;

means for deploying said reflector from a first reflector location to a second reflector location between said antenna and said radio when said carrying case is in said open condition; and means for covering said reflector to disguise the presence of said reflector when said carrying case is in said open condition.

* * * * *